Jan. 9, 1940.  W. SMITH  2,186,771
FABRIC CALENDERING
Filed Oct. 21, 1936
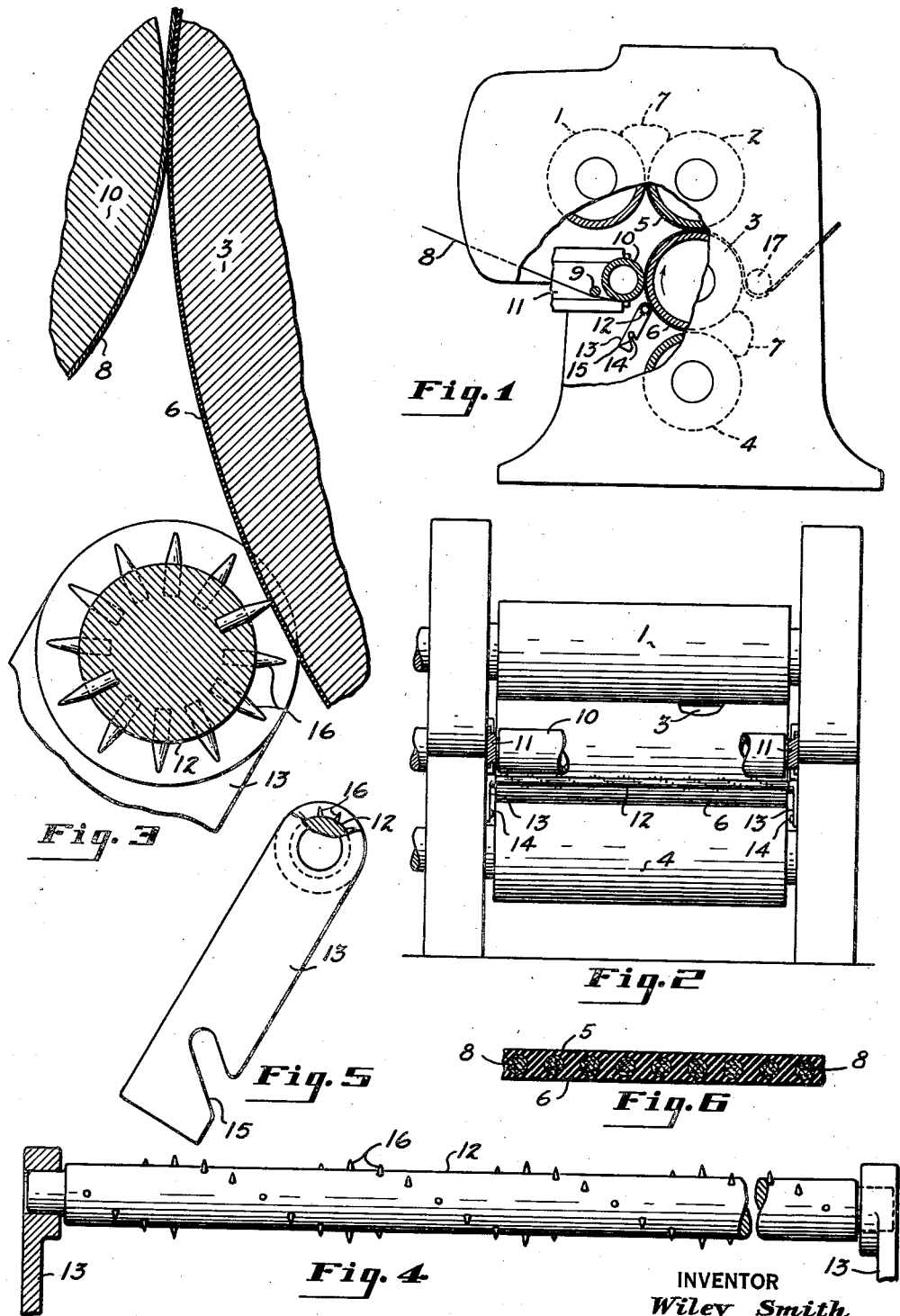
INVENTOR
*Wiley Smith*
BY
*Evans & McCoy*
ATTORNEYS Patented Jan. 9, 1940

2,186,771

UNITED STATES PATENT OFFICE 2,186,771

FABRIC CALENDERING

Wiley Smith, Akron, Ohio, assignor to The General Tire & Rubber Company, Akron, Ohio, a corporation of Ohio Application October 21, 1936, Serial No. 106,779

14 Claims. (Cl. 154—2)

This invention relates to an improved process and apparatus for incorporating cords or fabric in a plastic material such as rubber, and particularly to the manufacture of weftless or weakweft cord fabric for use in making tires, in which the longitudinal cords of the fabric are spaced a substantial distance from each other.

In applying freshly sheeted rubber to cords in a calender where the cords are fed over a guide or pressure roll and into contact with a sheet of rubber, and then fed through the bight between calender rolls, sometimes air collects under the sheet of rubber adjacent the bight of the calender rolls and forms bubbles of considerable size. These bubbles, when once started, may become several inches in diameter as air continues to collect in advance of the bight of the calender under the film of rubber that carries the cords. These bubbles have a tendency to migrate suddenly from one position adjacent the bight to another position adjacent the bight during the calendering operation. This movement of an air bubble from one side of a calender roll to the other and underneath the sheet of rubber carried by the roll tends to disturb the initial relationship established between the cords themselves and between the cords or fabric and the freshly sheeted rubber, so that the cords are likely to become displaced and out of alinement. The cord elements also have a tendency to cross each other where they pass over the edge portions of such bubbles. When a cord has thus become displaced in a calender of the character to which this invention relates other cord elements are sometimes pushed out of place so that it may even be necessary to stop the machine to position the cord elements in their relative places on the sheet of rubber. When weakweft fabric of wide spacing is being coated or rubberized in such calenders, there may also be a tendency for bubbles to form as described above and cause wrinkles or distortions in the fabric. It will be apparent that operation of a calender under such conditions may be very unsatisfactory. For consideration of economy alone it is desirable to eliminate these air bubbles; not only is there considerable loss of time in shutting down the calender to reset the cords or fabric, but the defective portions must be cut out of the product since they are unsuitable for most uses. This is particularly true in connection with the manufacture of vehicle tires.

It is, therefore, an object of the present invention to provide an improved process and apparatus for the manufacture of coated fabric or cord of the character described, which is relatively simple and inexpensive and may be adapted to present manufacturing methods.

A further object is to provide an improved product of the character mentioned which may be continuously produced with uniformly spaced cord elements.

Broadly, the invention contemplates the forming of a multiplicity of small holes in the sheet or film of plastic or rubber prior to the application of the fabric or cords in order that any entrapped air, or air that is caused to locate under the sheet because of movement thereof on the calender roll at the point of application of the fabric to the sheet, or otherwise, may be vented before the fabric and sheet reach the bight of the calender rolls.

A convenient and preferred form of apparatus for practicing this process is illustrated and described in connection with a calender for applying sheets of rubber to cords to produce a rubber coated fabric product for use in the manufacture of vehicle tires. It is apparent, however, that the formation of the multiplicity of holes in the rubber sheet may be made by any number of devices, including hand devices, such as pronged hand wheels and the like that could be run back and forth over the face of the calender roll and that the invention is applicable to the manufacture of other forms of fabric and plastic combinations.

In the drawing, in which the parts are indicated by reference numerals,

Figure 1 is a diagrammatic side elevation with parts broken away of a calendering device embodying the present invention;

Fig. 2 is a front elevational view of the device shown in Fig. 1;

Fig. 3 is an enlarged fragmentary detail view in section of a portion of the calender shown in Fig. 1;

Fig. 4 is an elevational view of the perforating roll;

Fig. 5 is a detail view partially in section showing a supporting arm for mounting the perforating roll; and Fig. 6 is an enlarged fragmentary detail, in section, showing the appearance of the coated fabric product.

The calender comprises a set of main calender rolls 1, 2, 3 and 4 that form sheets of rubber 5 and 6 from suitable banks 7 of previously milled rubber in accordance with well known practice. A series of unconnected spaced cords 8 pass under a suitable spacing bar 9 and over a guide roll 10 into contact with the rubber sheet 6 that is carried by the roll 3 of the calender. The guide roll 10 applies the cords to the sheet of rubber under pressure of hydraulic cylinders in accordance with well known practice. These cylinders are omitted from the drawing but are arranged to actuate guide roll bearing slides 11.

In combination with the calender a removable pricker roll 12 is mounted on suitable arms 13 carried on pins 14 that are secured in the calender frame and are received in slots 15 of the arms 13. The pricker roll is arranged to bear against the sheet 6 that is carried by the calender roll 3 and perforate the sheet in a multiplicity of distributed points during operation of the calender. The weight of the pricker roll 12 is sufficient to cause the barbs or points 16 that are carried by the pricker roll to contact with and perforate the sheet of rubber carried by the roll 3. The barbs 16 may be constructed of any suitable material such as iron or steel and are arranged in spiral formation around the roller 12 so that as the calender roll 3 rotates, the roller 12 is also rotated thereby, due to a number of the barbs or spikes being engaged in the sheet 6. Thus the sheet 6, after passing between the barbed or spiked roller 12 and roll 3 has a plurality of spaced perforations over its entire surface which readily permit the escape of air. A suitable take-off roll or bar 17 is employed for guiding the rubberized fabric from the calender to suitable cooling and wind-up devices, as well known in the art.

Operation of the calender is as follows:

The rolls are heated to a suitable operating temperature, milled rubber 7 is applied in the proper bights of the calender, and the sheets 5 and 6 are formed by the rotation of the calender rolls in accordance with well known practice.

The relation of the film of rubber, calender roll, pricker roll, and the guide roll, is shown in the enlarged, fragmentary, sectional view, Fig. 3. The rubber film 6 carried by the roll 3 is under tension, and, therefore, the openings formed by the barbs or prickers 16 of the pricker roll 12 do not tend to close up before reaching the bight between the calender rolls 2 and 3.

This invention is of great benefit in the calendering of weftless fabric having widely spaced cords, such, for instance, as that used in forming breaker strips for automobile tire building. It has been found that a superior product results from the even application of rubber to the cords and the more uniform and even positioning of such cords on the sheet of rubber resulting from the absence of air pockets between the rubber sheet and the calender roll adjacent the calender bight that forms the fabric into the rubber sheet.

Although I have described my invention as applied to weftless fabric, it has been found also to be of considerable benefit in the application of the film of rubber to woven fabrics, such, for instance, as weakweft fabrics having considerable spacing between the cords and other more open fabric, where the fabric has insufficient body to prevent wrinkling of the fabric because of cross-threading by reason of the air pockets formed adjacent the calender bight. Numerous modifications of the apparatus and various means of producing the perforations in the sheet are contemplated and intended to be included within the scope of the appended claims.

What I claim is:

1. The combination with a calender for sheeting out rubber to which cords are applied and in which the cords and the rubber sheet are fed to a bight between rolls, of a roller having a plurality of protruding spaced points, said roller pivotally supported and the points arranged to bear against a roll of the calender.

2. The combination with a calender for sheeting out rubber to which cords are applied and in which the cords and the rubber sheet are fed to a bight between rolls, of a roller having a plurality of protruding spaced points, said roller carried on arms pivoted in the calender frame and arranged to lean toward a calender roll whereby the points may intermittently engage a sheet carried on said roll to rotate the roller and penetrate the sheet.

3. The combination with a calender for sheeting out rubber to which cords are applied and in which the cords and the rubber sheet are fed to a bight between rolls, of a roller having a plurality of protruding spaced points, said roller carried on arms pivoted in the calender frame and arranged to lean toward a calender roll whereby the points may intermittently engage a sheet carried on said roll to rotate the roller and penetrate the sheet, and means whereby the points may be withdrawn from engagement with said roll.

4. The combination with a calender for sheeting out rubber to which cords are applied and in which the cords and the rubber sheet are fed to a bight between rolls, of a roller having a plurality of protruding spaced points, arms to support the roller with the points arranged to intermittently engage a sheet carried on a roll of the calender, and pivots for the arms, said pivots including pins and slots to receive the pins whereby the points may be withdrawn from said engaging position.

5. In a calender for sheeting out rubber, a pair of rolls for receiving in the bight thereof a mass of raw rubber compound and forming the same into a relatively thin sheet adhering to one of the rolls, means for applying cords to the unvulcanized rubber sheet while on said last named roll, and means for forming a plurality of distributed air-venting apertures in the raw rubber sheet while on said roll and before the application of the cords, said last named means comprising a plurality of spaced barbs arranged to intermittently pierce the sheet upon rotation of the sheet carrying roll.

6. In a calender for sheeting out rubber, a pair of rolls for receiving in the bight thereof a mass of raw rubber compound and forming the same into a relatively thin sheet adhering to one of the rolls, means for applying cords to the unvulcanized rubber sheet while on said last named roll, and means for forming a plurality of distributed air-venting apertures in the raw rubber sheet while on said roll and before the application of the cords, said last named means comprising a barbed roller arranged to rest by gravity against the sheet carrying roll and rotate therewith to perforate the sheet.

7. The method of making cord reinforced rubber sheet material which comprises continuously forming raw rubber compound into a relatively thin sheet, continuously forming a multiplicity of distributed perforations in the thin sheet, continuously forming raw rubber compound into a second relatively thin sheet, continuously bringing the perforated sheet and second sheet together, continuously feeding a multiplicity of separated cords between the sheets as the latter approach one another, and continuously pressing the sheets into adhering contact with the cords therebetween to seal the perforations.

8. The method of making cord reinforced rubber sheet material which comprises continuously forming raw rubber compound into a relatively thin sheet, continuously forming a multiplicity of distributed perforations in the thin sheet, continuously feeding a multiplicity of separated cords into contact with the perforated thin rubber sheet, continuously forming raw rubber compound into a second relatively thin sheet, continuously bringing the perforated sheet and second sheet together while holding the cords against the perforated sheet, and continuously pressing the sheets into adhering contact with the cords therebetween to seal the perforations.

9. The method of making cord reinforced rubber sheet material which comprises continuously forming raw rubber compound into a relatively thin sheet, advancing the formed sheet in an arcuate path, supporting the advancing sheet across substantially its entire width, continuously forming a multiplicity of distributed perforations in the advancing sheet while it is so supported, continuously applying cords to the perforated rubber sheet while the latter is being advanced and supported, and squeezing the cords and sheet together to embed the cords in the sheet and close the perforations.

10. In a calender for receiving a mass of raw rubber compound and forming the same into a relatively thin sheet, a roll for carrying the formed sheet, a perforating implement mounted adjacent said roll, means for carrying the perforator toward and away from the roll during rotation of the latter to form a number of distributed air-venting holes in the sheet carried by the roll, and means for applying a plurality of separated cords to the perforated sheet on the roll.

11. In a calender for receiving a mass of raw rubber compound and forming the same into a relatively thin sheet, a roll for carrying the formed sheet, a rotatable member mounted adjacent the roll, a perforating barb carried by the rotatable member and arranged to move toward and away from the roll during rotation of the member to form a number of air-venting perforations in the sheet carried by the roll, and means for applying a plurality of separated cords to the perforated sheet on the roll.

12. In a calender for receiving a mass of raw rubber compound and forming the same into a relatively thin sheet, a roll for carrying the formed sheet, a rotatable roller mounted adjacent the roll and substantially parallel therewith, a multiplicity of substantially radially directed barbs extending from the roller, said roller arranged to rotate with the sheet-carrying roll to carry the barbs into and out of perforating engagement with the sheet on the roll, and means for applying a plurality of separated cords to the perforated sheet on the roll.

13. The method of making multiple ply rubber sheet material on a multiple roll calender, which comprises rotating and heating one of the calender rolls, continuously forming raw rubber compound into a sheet moving with the heated roll and in adhering contact therewith, forming a multiplicity of distributed perforations in the sheet while the sheet is against the moving roll, pressing a second sheet of raw rubber compound, formed separately from the first named sheet, against the perforated sheet while the perforated sheet remains in contact with the rotating roll, and so that initial contact between the sheets occurs after the perforations have been formed, and simultaneously removing both sheets from the roll in adhering contact with one another and in the form of a continuous homogeneous composite sheet.

14. The method of making multiple ply rubber sheet material on a multiple roll calender, which comprises rotating and heating one of the calender rolls, continuously forming raw rubber compound into a sheet moving with the heated roll and in adhering contact therewith, forming a multiplicity of distributed perforations in the sheet while the sheet is against the moving roll, rotating a second roll of the calender in parallel relation to the heated roll, continuously forming raw rubber compound, having a plasticity corresponding to that of the first named rubber, into a second sheet, separated from the first named sheet, and moving with the second roll and in adhering contact therewith, pressing the second sheet against the perforated sheet while both sheets remain in contact with their respective rolls, and so that initial contact between the sheets occurs after the perforations have been formed, and simultaneously removing both sheets from one of the rolls, and in adhering contact with one another, in the form of a continuous homogeneous composite sheet.

WILEY SMITH.